Sept. 25, 1956 S. LUBKIN ET AL 2,764,463
MAGNETIC RECORDING SYSTEM
Filed May 26, 1953 4 Sheets-Sheet 1

INVENTORS.
SAMUEL LUBKIN
DANIEL GOLDEN
BY S.C. Yuter
ATTORNEY

MAGNETIC RECORDING SYSTEM

Filed May 26, 1953 4 Sheets-Sheet 2

*INVENTORS.*
SAMUEL LUBKIN
DANIEL GOLDEN

*BY* S.C. Yuter
*ATTORNEY*

Sept. 25, 1956 S. LUBKIN ET AL 2,764,463

MAGNETIC RECORDING SYSTEM

Filed May 26, 1953 4 Sheets-Sheet 3

INVENTORS.
SAMUEL LUBKIN
DANIEL GOLDEN

BY S.C. Yuter

ATTORNEY

Sept. 25, 1956 S. LUBKIN ET AL 2,764,463

MAGNETIC RECORDING SYSTEM

Filed May 26, 1953 4 Sheets-Sheet 4

INVENTORS.
SAMUEL LUBKIN
DANIEL GOLDEN

BY S. C. Yuter

ATTORNEY

United States Patent Office 2,764,463

Patented Sept. 25, 1956

2,764,463

MAGNETIC RECORDING SYSTEM

Samuel Lubkin, Brooklyn, and Daniel Golden, Bronx, N. Y., assignors to Underwood Corporation, New York, N. Y., a corporation of Delaware Application May 26, 1953, Serial No. 357,502

25 Claims. (Cl. 346—74)

This invention relates to magnetic recording, and more particularly to the reproducing of information recorded in pulse signal form on a magnetic storage medium suitable for use with a data processing device such as an electronic digital computer.

A digital computer performs operations with decimal numbers expressed in the binary form. The binary system of computation, using the binary digits "1" and "0," is well suited to computers since a binary number may be expressed by the presence or absence of a particular condition, for example, the presence or absence of a given magnetic state on a unit area of a magnetic medium such as the surface of a magnetizable tape or drum. Since any sequential series of operations require that certain numbers be stored for later reference, it is convenient to record signals representing the numbers in binary form on a magnetizable material.

In one type of magnetic storage system heretofore known, information coded in terms of binary digits is magnetically recorded in unit areas on the magnetizable surface of a rotating drum. If the area is magnetized in one direction, the digit it represents is a "1." If the area is magnetized in the other direction, the digit is "0." In another type, a "0" is represented by the absence of a magnetic pattern representing a "1."

The magnetized areas storing information corresponding to individual digits may be arranged in a peripheral channel on the cylindrical surface of the drum. The gap between the pole pieces of a magnetic head is positioned next to the surface of the drum so that the magnetic head scans the channel and performs the operations of recording (writing), playback (reading), and erasing information in the channel. To avoid drum surface wear the gap of the magnetic head is not in contact with the surface of the drum but is very close to it.

Information is recorded by rotating the drum so that the unit areas in the channel pass the gap while the magnetic recording head is energized by the signal current. The fringing flux produced in the vicinity of the gap penetrates the surface of the drum to form the magnetic patterns. The recording signals are spaced so that each magnetized area is of sufficient size to play back one of the digits of information. When the pattern of magnetic flux variations in the channel is later passed beneath a magnetic reading head, the time variation of the flux as the areas pass the gap generates a playback signal which is related to the original recording signals. More particularly, the recorded magnetic flux patterns are directly related to the amplitude of the recording signal, and the playback signal is proportional to the rate of change of the flux patterns.

One of the basic physical characteristics of a magnetic drum is the number of digits which can be carried in a single channel. This is determined by dividing the physical length of the channel by the physical length of the flux pattern representing a single digit. Since it is desirable to store the maximum amount of information, the channels may be increased in length by making the diameter of the drum large. However, this is undesirable since mechanical considerations may require a reduction of the speed of drum rotation which will increase the amount of time (called the access time) required to locate a particular digit in the channel. Since the speed of operation of a computer employing a magnetic drum is limited by the access time, it is preferable that the drum diameter be as small as possible.

An alternative approach to the problem is to squeeze as many digits of information in a single channel as possible. This implies that the unit areas which carry the magnetic flux of each digit be of minimum size. Unfortunately, the size of each area is limited to that which will allow for enough variation of flux density to produce a playback signal of sufficient amplitude. This is complicated by the fact that there is a minimum area size required to record any signal. In addition, the recorded flux pattern spreads out due to the fringing effect at the gap of the magnetic head when a signal is recorded. The fringing effect is accentuated by the spacing of the head from the drum surface. This fringing effect results in an overlapping of magnetized areas which reduces the definition between elements and consequently the rate of change of the flux in a particular area.

The loss of definition reduces the difference between the amplitude of the playback signals and the noise level. The noise may be picked up from adjacent leads by capacity coupling, or due to stray magnetic fields, or caused by minor variations in the magnetic properties and the thickness of the magnetizable surface of the drum. The difference between the playback signal amplitude and the noise level must be such that an amplifier can discriminate between the two, otherwise the recorded information will be lost.

The signal to noise ratio may be improved by increasing the number of turns on the magnetic head. However, the use of the same head and winding for reading and recording is preferable and the high recording currents limit the number of turns which may be wound on the magnetic head. In addition, increasing the number of turns undesirably increases the impedance of the head, particularly when a high pulse repetition rate is employed.

Playback signal definition may be increased by differentiating the playback signal one or more times to produce relatively narrow waveforms representing the information. Additional differentiation functions to accurately position each waveform with respect to the timing of the computer. However, the noise signals are also emphasized and the signal to noise ratio is substantially reduced so that the amount of improvement in overall performance obtainable is severely limited.

It is also desirable that the playback signals be of relatively constant shape, amplitude and timing to facilitate computer design. Unfortunately, it has been found that the shape, amplitude and timing of a playback signal will be affected by the presence or absence of adjacent signals due to the overlapping of the adjacent flux patterns. For example, if a series of pulses is recorded, the first pulse will produce a greater positive change in flux than the second since the flux pattern corresponding to the first pulse will increase from a given minimum density to the maximum density while the second flux pattern will partially overlap the trailing edge of the first flux pattern to produce a smaller increase of flux density. The second pulse thus produces a playback signal which is of smaller amplitude and generally of different shape and timing than the first playback signal.

An object of the invention, therefore, is to provide an improved method of magnetically reproducing information recorded in pulse signal form.

Another object is to provide a magnetic signal reproducing system suitable for use with an electronic digital computer which greatly improves the signal to noise ratio of the playback signals.

A further object of the invention is to provide a magnetic recording system which increases the amount of information that can be stored in a magnetic storage medium.

A still further object is to provide a method of and means for playing back signals stored on a magnetic medium so that the signal amplitude, shape, and timing are relatively constant.

In accordance with one embodiment of the invention, information stored on a magnetizable surface is reproduced by generating playback and inverted playback signals corresponding to the recorded information. The playback signals are then delayed a predetermined amount and the positive polarity portions of the delayed playback signals and the inverted playback signals are combined to produce pulses of relatively constant amplitude and shape which always occur in a given and predictable time sequence.

One of the advantages of magnetically recording information is that the data can be erased magnetically or changed by recording signals representing other information on the same areas. To erase a flux pattern representing a "1" and substitute a "0" (the absence of a "1"), direct current is usually passed through the magnetic head while the particular area on the drum which is to be affected passes the gap. Theoretically, this removes the varied flux pattern and substitutes a constant flux pattern which will not generate a signal on playback.

In practice, what usually happens is that the variable flux patterns are not fully erased and residual varying magnetic flux patterns remain which will generate undesired playback signals of smaller amplitude. This complicates the computer design since precautions have to be taken to avoid interpreting these residual flux patterns as information.

The problem is partially resolved by representing the binary digit "1" by a magnetically recorded signal of one polarity and the binary digit "0" not by the absence of a "1" but by a signal of opposite magnetic polarity. Thus, when a "1" is to be erased a negative pulse will be recorded in the area formerly containing the flux pattern produced by the positive recording signal.

Unfortunately, all of the above-mentioned problems concerning definition and the varying amplitudes, shapes and timing of both the positive and negative signals are present, in addition to the noise problem, which further complicate the computer design.

It is another object of the invention, therefore, to provide a method of and means for playing back signals of positive and negative polarity which are stored on a magnetizable surface so that the signals are clearly defined and are of relative constant shape and timing, and occur at a constant rate.

A further object is to minimize the effect of noise in a magnetic recording system utilizing signals of opposite polarity to represent information.

In accordance with another embodiment of the invention pulses positively and negatively recorded on the surface of a magnetizable medium are reproduced by generating playback and inverted playback signals corresponding to the recording pulses and producing delayed playback signals and inverted delayed playback signals. Then the positive polarity portions of the delayed playback signals and the inverted playback signals are combined to generate pulses corresponding to positive pulse recordings. Similarly, the inverted delayed playback signals and the playback signals are combined to generate pulses corresponding to negative pulse recordings. The generated pulses are of relatively fixed amplitude and shape and occur in synchronism with the recording pulses which considerably simplifies the design of the computer.

Other objects, features and advantages will appear in the subsequent detail description which is accompanied by drawings wherein.

*General description of systems*

Figures 1, 2:
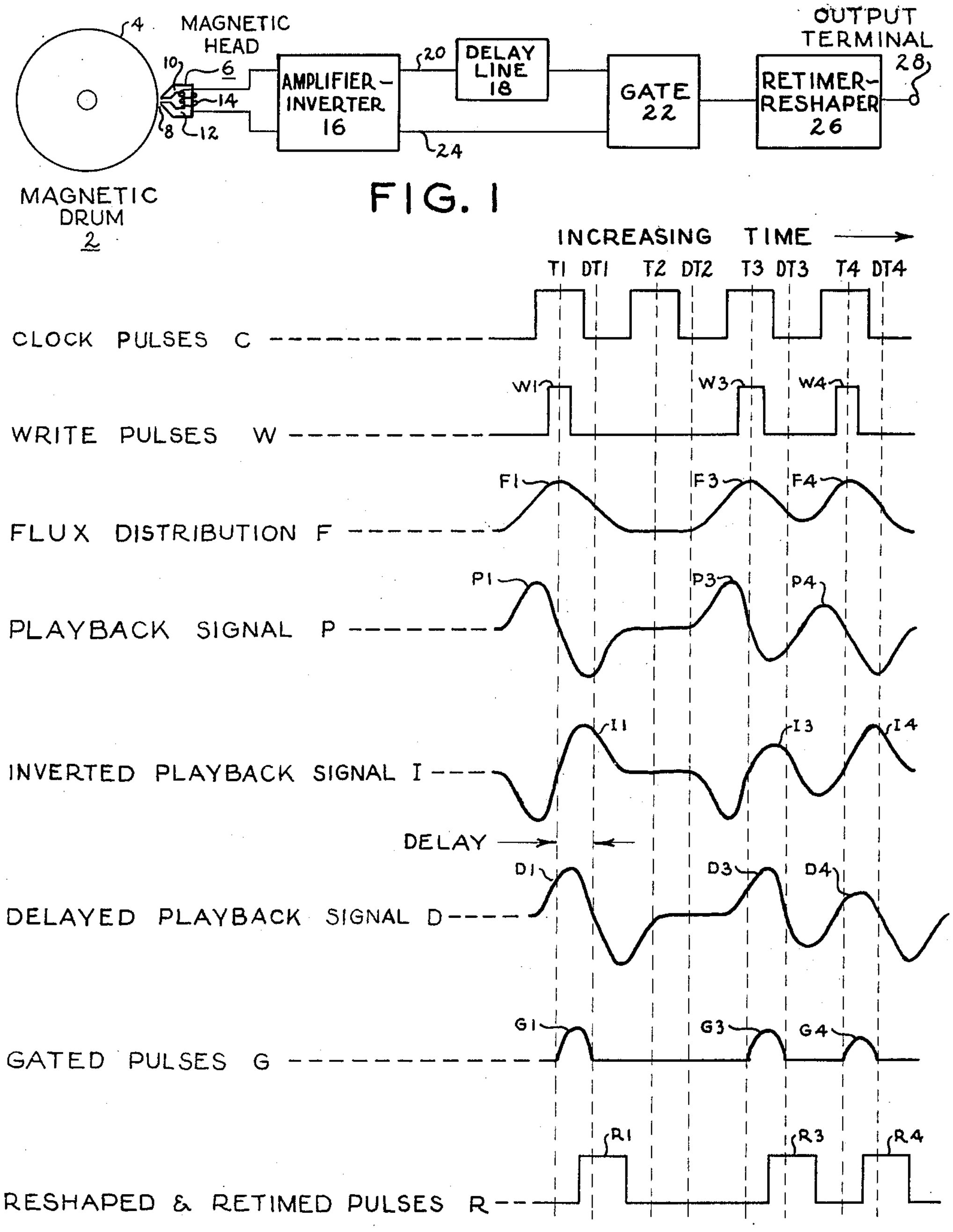
Fig. 1 is a schematic block diagram of a signal reproducing system embodying the invention which is suitable for magnetic recording systems employing the absence of a "1" signal to represent a "0."
Fig. 2 is a graph showing the wave forms (somewhat idealized) which occur during the operation of the system illustrated in Fig. 1.

Referring more particularly to the signal reproducing system illustrated in Figure 1, which will be described in greater detail hereinafter, the magnetic drum 2 is preferably constructed from a non-magnetizable metal and is rotated at high speed by suitable apparatus (not shown). The surface 4 of the magnetic drum 2 is thinly coated with a magnetizable material, for example, ferric or ferrous oxide.

The magnetic head 6 comprises the pole pieces 10 and 12 and the winding 14. The pole pieces 10 and 12 are separated by the gap 8 between them. The gap 8 is positioned adjacent to one of the channels on surface 4. The winding 14 is connected to the amplifier-inverter 16 which amplifies and inverts any signal detected by the magnetic head 6.

The amplified or playback signal is coupled to the delay line 18 by the playback signal line 20. The delay line 18, in turn, is connected to one input of the gate 22. The other input of the gate 22 is connected to the inverted output of the amplifier-inverter 16 via the inverted signal line 24.

The output of the gate 22 is connected to the reshaper-retimer 26 which reshapes the gated signal and retimes it so that it appears at the output terminal 28 properly shaped and in synchronism with other signals in the computer (not shown).

Referring to the table of wave forms in Figure 2, the clock pulses C are generated in the computer and are used to time all of the computer operations. In order to record information, say the decimal number 11 represented by write pulses W corresponding to the binary number 1011 (with a "0" represented by the absence of a "1"), the write pulses W are recorded in a channel on the surface 4 of the magnetic drum 2 by recording means (not shown). The pulses W, which are in synchronism with the clock pulses C, produce the magnetization pattern shown as the flux distribution F.

It should be noted that if the write pulses W are narrow enough, which is preferable, the flux distribution F due to a single pulse recording will reach a maximum at a point corresponding to the mid-point of the pulse W. For example, the write pulse W1 produces the flux distribution F1. The flux distribution F1, which is spread out over a relatively large area compared with the shape of the write pulse W1 due to the fringe effect at the gap 8 of the magnetic head 6 (see Fig. 1), has a mid-point corresponding to the maximum flux density at time T1. Stated otherwise, the write pulses W of Fig. 2 are preferably chosen to have a width which is narrow enough to produce a flux distribution which reaches a maximum density at a point which can be readily detected.

When the flux distribution F representing the recorded binary number 1011 is swept past the magnetic head 6, a playback signal P will be generated in the winding 14 and amplified and inverted by the amplifier-inverter 16. Since the magnetic head 6 will only detect a change in flux density, the playback signal P1 (corresponding to the write pulse W1) will first swing increasingly positive and then decreasingly positive as the maximum point of flux distribution F1 is approached. At the maximum point, when the rate of change of flux goes from positive through zero to negative, the playback signal P1 will be of zero amplitude. Then the playback signal P1 will swing increasingly negative then decreasingly negative and return to zero at the end of the flux distribution F1.

Therefore, the playback signal P will always swing from a positive amplitude through zero to a negative amplitude at a point corresponding to the mid-point of the write pulse W if the write pulse W is chosen to be narrow enough to produce a flux distribution F having a detectable maximum point.

The playback signal P is then delayed by the delay line 18 before appearing at the gate 22 as the delayed play back signal D simultaneously with the inverted playback signal I. The amount of delay is preferably chosen to be one-quarter to one-half the period of the playback signal P; for example, one-third the period as shown.

The gate 22 will pass a signal corresponding to the most negative signal present at any of the inputs to the gate 22. Since the reshaper-retimer 26 will only operate on positive signals, negative signal coincidence can be disregarded. Therefore, gated pulses G will be reshaped and retimed and appear as the reshaped and retimed pulses R only when portions of the inverted playback signal I and the delayed playback signal D are of positive polarity at the same time. For example, the inverted playback signal I1 goes positive at time T1. The delayed playback signal D1 is positive at that time and goes negative at time DT1 (equal to time T1 plus the delay) before the inverted playback signal I1 goes negative.

Therefore, the gated pulse G1 will be initiated at time T1 and terminated at time DT1. Since time T1 is determined by the zero amplitude point of the playback signal corresponding to the center of the write pulse W1, and time DT1 is determined by the amount of time equal to the fixed delay of delay line 18, the gated pulse G1 will be generated in synchronism with the write pulses W and will be clearly defined and of relatively constant shape and amplitude so that reshaping and retiming is readily facilitated.

The gated pulses G will be reshaped and retimed by the reshaper-retimer 26 and will appear at the output terminal 28 as the reshaped and retimed pulses R in synchronism with the write pulses W.

In summary, in accordance with one embodiment of the invention, information stored in a magnetizable medium is reproduced by generating a playback signal and an inverted playback signal corresponding to the recorded information, delaying the playback signal, and combining the positive polarity portions of the delayed signal and the inverted signal.

It should be noted that no playback signal will be gated unless the signal first swings positive and then negative so as to insure that positive polarity portions of the signals will appear simultaneously at the inputs to gate 22. Further, as will later be explained, only properly timed signals are reshaped by the reshaper-retimer 26. Consequently, since noise signals will rarely if ever occur with a changing polarity sequence, and related to the timing of the desired signals, the signal to noise ratio of the playback signals is greatly improved.

The write pulses W3 and W4, having the respective mid-points at times T3 and T4, illustrate the operation of the invention when pulses are recorded adjacent each other. The corresponding flux distributions F3 and F4 and playback signals P3 and P4 show how the playback signals P are affected when the flux distributions F overlap. Since the playback signal is a function of the rate of change of flux (the rising slopes of flux distribution F in this example) the playback signal P3 will be of larger amplitude than the playback signal P4 due to the overlapping of flux between the flux distributions F3 and F4 and the resultant smaller rate of change of flux.

If the playback signal P were used in the computer in this form great care would have to be taken to adjust the computer operation for relatively poor definition and for relatively wide variations in amplitude and timing of the playback signal. However, in accordance with the operation of the invention, this variation in timing is avoided because the gated pulses G3 and G4 (produced by the coincidence of the inverted playback signal I3 and the delayed playback signal D3, and the coincidence of the inverted playback signal I4 and the delayed playback signal D4) will be initiated at the predetermined times T3 and T4 and terminated at the predetermined times DT3 and DT4. Although the gated pulses G3 and G4 are of slightly lower amplitude than the gate pulse G1 produced by an isolated recording, they are clearly defined and of sufficient amplitude to facilitate reshaping and retiming to produce the pulses R3 and R4, particularly since the gated pulses G occur at predetermined times which are in synchronism with the computer operation as determined by the clock pulses C.

Therefore, since the differences in amplitude, shape and timing between isolated and non-isolated playback signals are substantially reduced, and since definition is considerably increased, more information may be recorded in a given area of a magnetic storage medium.

Figure 3:
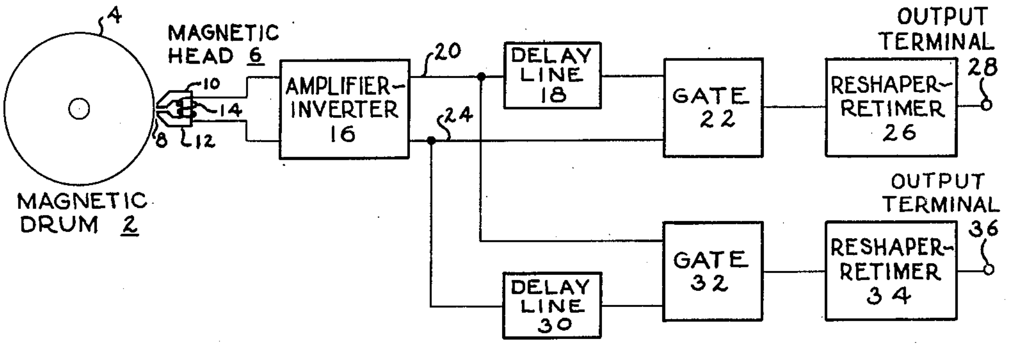
Fig. 3 is a schematic block diagram of another embodiment of the invention particularly adaptable to negative pulse erase systems.

If the recorded signals are to be erased or altered, the magnetic head 6 is energized by suitable erasing means (not shown) with a direct current signal at the appropriate time so as to record a flux pattern of non-varying intensity which will not play back a signal. Where a negative pulse is employed to represent a "0" then negative pulse erase is employed. Another embodiment of the invention particularly adaptable to negative pulse erase systems is shown in Fig. 3.

The magnetic drum 2, magnetic head 6, amplifier-inverter 16, delay line 18, gate 22, and reshaper-retimer 26 function as explained above to produce reshaped and retimed pulses R corresponding to "1"s at the output terminal 28. Negative pulses representing "0"s are reproduced in substantially the same manner by the delay line 30, the gate 32, and the reshaper-retimer 34. One input of the gate 32 is connected to the playback signal line 20 and the other input is coupled to the inverted signal line 24 by the delay line 30. The delay line 30 preferably is chosen to have the same delay as delay line 18. The output of the gate 32 is connected to the reshaper-retimer 34 which produces reshaped and retimed pulses at the output terminal 36.

Figure 5:
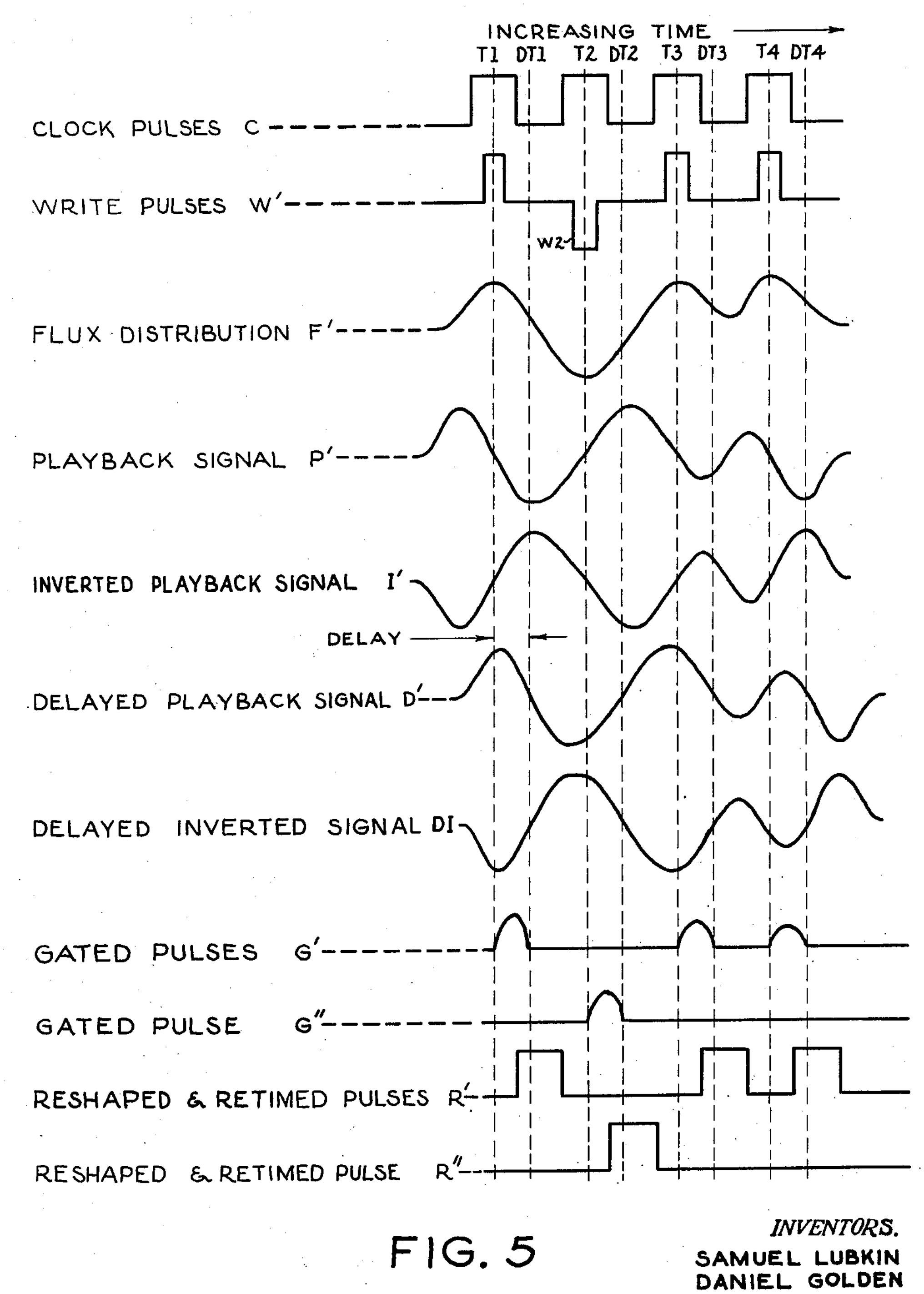
Fig. 5 is a table diagrammatically illustrating the pattern of signals (somewhat idealized) obtained during the operation of the apparatus shown in Figs. 3 and 4.

If the same binary number 1011 is to be stored, the write pulses W′ (see Fig. 5), with the negative pulse W2 representing the "0," are recorded on the magnetic drum 2. The resulting flux distribution F′ will generate the playback signal P′ and the inverted playback signal I′ on the playback signal I′ on playback. The playback signal P′ is then delayed by delay line 18 as before and appears at the gate 22 as the delayed playback signal D′. The common positive polarity portions of the delayed playback signal D′ and the inverted playback signal I′ are combined at gate 22 as explained above to produce the gated pulses G′ which are then reshaped and retimed to produce reshaped and retimed pulses R′ at the output terminal 28 corresponding to the "1"s. The inverted playback signal I′ is delayed by delay line 30 and appears at the gate 32 as the delayed inverted signal DI′. The common positive polarity portions of the playback signal P′ and the delayed inverted signal DI′ are combined at gate 32 to produce the gated pulse G″ which is then reshaped and retimed to produce reshaped and retimed pulse R″ at the output terminal 36 corresponding to the "0."

Figure 4:
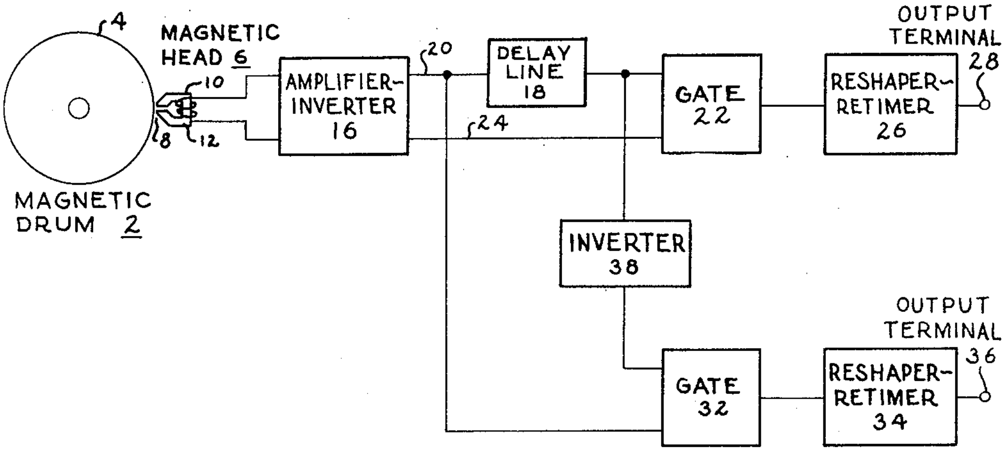
Fig. 4 shows a schematic block diagram of still another embodiment of the invention which is suitable for use with magnetic recording systems employing negative pulse erase.

A further embodiment of the invention also suitable for use with magnetic recording systems employing both positive and negative pulse recording is shown in Fig. 4. With this system the delayed inverted signal DI′ (see Fig. 5) is produced by inverting the delayed signal D′ by the inverter 38 which connects the output of the delay line 18 to one input of the gate 32. The other input of the gate 32 is connected to the playback signal line 20 so that both the positive polarity portions of the delayed inverted signal DI′ and the playback signal P′ can be combined at the gate 32.

In summary, each embodiment of the invention employs the same basic theory of operation. Pulses representing information are reproduced in synchronization with the recording pulse repetition rate since each of the generated pulses (pulses before reshaping and retiming) is initiated at a time corresponding to the midpoint of the recorded write pulse (times T1, T2, T3 and T4) and is terminated at a fixed amount of time thereafter (times DT1, DT2, DT3, and DT4). Since the write pulses are preferably chosen to be narrow enough to produce a single point of zero amplitude on playback corresponding to the midpoint of the write pulses, the generated pulses are of relatively constant shape and timing, and occur at a constant rate in both types of magnetic recording systems, and a substantial reduction in noise is achieved for the erason that noise rarely occurs in the symmetrical and timing patterns required to generate a signal in accordance with the invention. In addition, since definition is substantially increased, more information may be recorded in a given area of the magnetizable medium.

It should be noted that wider write pulses may be employed than illustrated so that the playback signal swing from positive to negative may not pass through zero at a single discernible point but may remain at zero amplitude for a short period of time. This would vary the initiation time of the gated pulses but if the reshaping and retiming is made dependent on the maximum amplitude point of the gated pulse, which will be relatively fixed in timing, the same results will be achieved as in the case of narrow write pulses.

*Detailed description*

Figure 6:
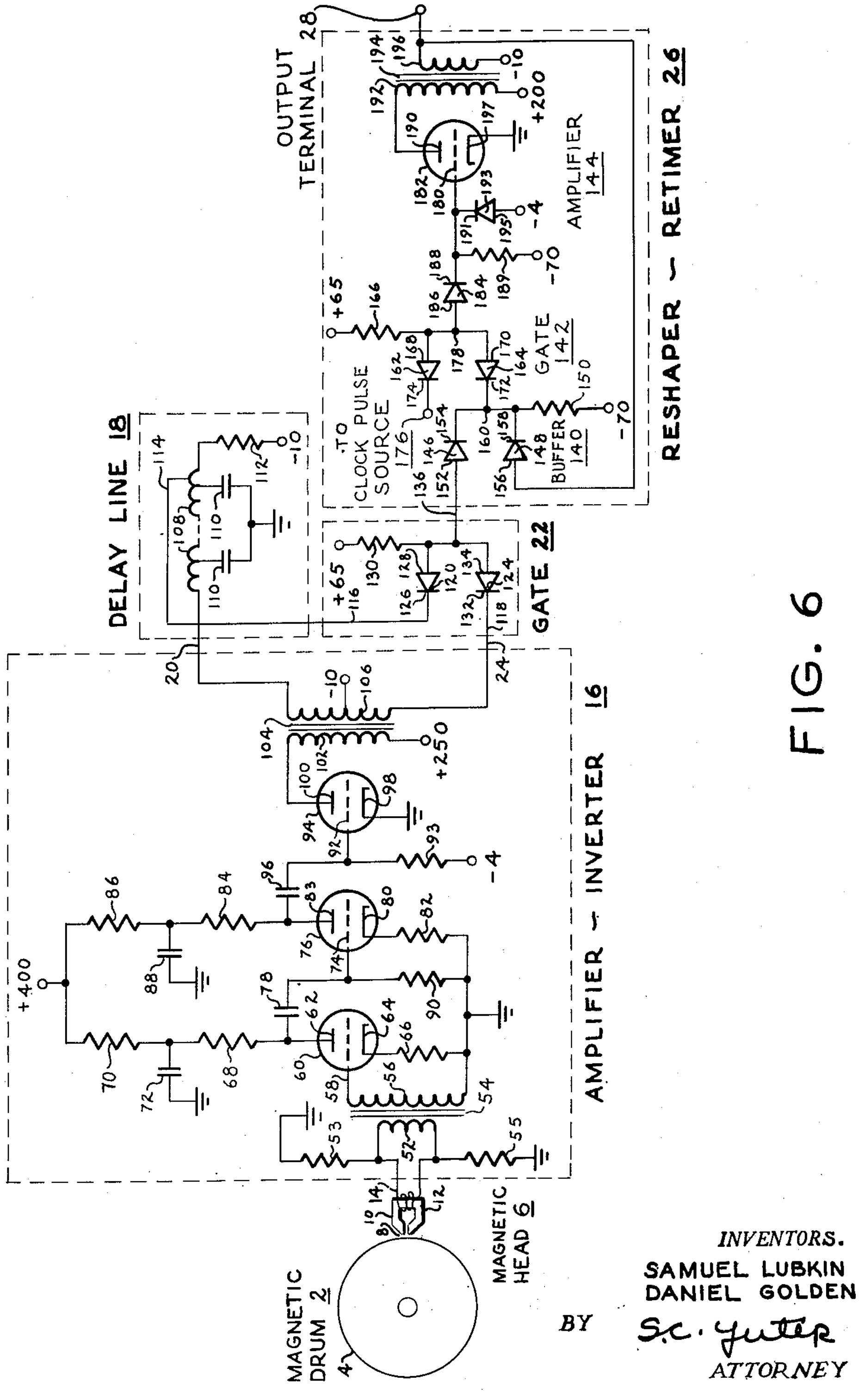
Fig. 6 is a schematic illustration of the system shown in Fig. 1 including circuits corresponding to all of the block symbols shown in Figs. 1, 3 and 4.

Referring more particularly to the system shown in Figure 6, which schematically illustrates the apparatus of Figure 1 and includes circuits corresponding to all of the blocks shown in Figures 1, 3 and 4, the magnetic head 6 is positioned adjacent to the surface 4 of the magnetic drum 2 as explained above. The gap 8 formed by the pole pieces 10 and 12 of the magnetic head 6 sweeps one channel on the magnetic drum 2 as the magnetic drum 2 rotates. The winding 14 couples the magnetic head 6 to the amplifier-inverter 16.

More particularly, the winding 14 is connected to the primary winding 52 of the input transformer 54. The resistors 53 and 55 couple each side of the winding 14 to ground and serve to leak any charge developed on the magnetic head 6 to ground. The secondary winding 56 of the input transformer 54 is coupled between the grid 58 of the triode amplifier 60 and ground. The triode amplifier 60 includes the anode 62 and the cathode 64. The cathode 64 is connected to ground via the resistor 66. The anode 62 is connected to a positive voltage source of four hundred volts via resistors 68 and 70 in series, with their junction bypassed to ground via bypass capacitor 72.

The anode 62 is coupled to the grid 74 of the triode amplifier 76 by the coupling capacitor 78. The triode amplifier 76 includes a cathode 80 connected to ground by means of the resistor 82 and an anode 83 coupled to the positive voltage source of four hundred volts by means of the resistors 84 and 86 in series, with their junction bypassed to ground by the bypass capacitor 88. The grid 74 is connected to ground via grid bias resistor 90.

The triode amplifiers 60 and 76 serve to amplify the playback signal P detected by the magnetic head 6 as the magnetic drum 2 is rotated. The playback signal P is coupled to the grid 92 of the amplifier-inverter triode 94 by the coupling capacitor 96. The grid 92 is coupled to a negative bias source of minus four volts by the resistor 93. The amplifier-inverter triode 94 includes a cathode 98 which is grounded, and an anode 100 which is coupled to a positive voltage source of two hundred fifty volts by the primary winding 102 of the output transformer 104. The center tap of the secondary winding 106 of the output transformer 104 is connected to a negative voltage source of minus ten volts. The amplified playback signal P appears on the playback signal line 20 which is connected to one side of the secondary winding 106, and the inverted playback signal I is present at the inverted signal line 24 which is connected to the other side of the secondary winding 106.

The delay line 18 connects the playback signal line 20 to one input of the gate 22. The delay line 18 is of the lumped parameter type and functions to provide a predetermined time delay of the input signal. The delay line 18 comprises a plurality of inductors 108 connected in series with a capacitor 110 coupling a tap on each inductor 108 to ground. The delay line 18 is terminated by a resistor 112 connected to a negative voltage source of minus ten volts. The resistor 112 functions to prevent reflections along the delay line 18. The output terminal 114 of the delay line is tapped from one of the inductors 108 so that the predetermined time delay required is thereby obtained. The output terminal 114 is coupled to the input terminal 116 of the gate 22. The inverted signal I is coupled to the input terminal 118 of the gate 22 via the inverted signal line 24 connected to the amplifier-inverter 16. A suitable delay line is described and claimed in the co-pending application of Samuel Lubkin, Serial No. 289,236, filed May 22, 1952 and assigned to the same assignee.

The gate 22 is of the coincidence or "and" type and comprises the crystal diodes 120 and 124 which are preferably of the germanium crystal diode type, although any unilateral conducting device will suffice. The crystal diode 120 comprises the cathode 126 connected to the input terminal 116 and the anode 128 which is coupled to a positive voltage source of sixty-five volts by the resistor 130. The crystal diode 124 includes the cathode 132 connected to the input terminal 118 and the anode 134 connected to the output terminal 136 which is connected to the junction of the anode 128 and the resistor 130.

The voltage at the output terminal 136 of the gate 22 will always be equal to the lowest input voltage as will be hereinafter explained. If no signal is present at either input terminal 116 or 118, the cathodes 126 and 132 will be at a potential of minus ten volts since the cathode 132 is coupled to a minus ten volt source by the secondary winding 106 and the cathode 126 is coupled to a negative voltage source of minus ten volts by means of the resistor 112. The anodes 128 and 134 are initially at a positive potential approximating sixty-five volts since the output terminal 136 is coupled to the positive voltage source of sixty-five volts by the resistor 130. If no signal is present at either input the output voltage will be equal to minus ten volts since both crystal diodes 120 and 124 will conduct. If the voltage at the input terminal 118 rises above minus ten volts, the diode 124 will become non-conductive because the anode 134 will remain at a potential of minus ten volts (the voltage at the output terminal 136) since the crystal diode 120 will still conduct. In a similar manner, an increase in voltage at the input terminal 116 will cause the crystal diode 120 to disconnect if the input terminal 118 remains at a potential of minus ten volts. In other words, the input terminal having the most negative potential will determine the voltage at the output terminal 136. Therefore, in order to get a signal at the output terminal 136, the voltages at the input terminals must rise simultaneously.

The output terminal 136 is connected to the reshaper-retimer 26 which functions to reshape and retime a signal passed by gate 22. The reshaper-retimer 26 comprises the buffer 140, the gate 142, and the amplifier 144 in series.

The buffer 140 comprises the crystal diodes 146 and 148 and the resistor 150. The crystal diode 146 includes the anode 152 which is connected to the output terminal 136 and the cathode 154 which is coupled to a negative voltage source of minus seventy volts via resistor 150. The crystal diode 148 includes the anode 156 connected to the output of the amplifier 144, and the cathode 158 connected to the junction 160 of the cathode 154 and the resistor 150.

The voltage appearing at the junction 160 will be equal to the highest of the voltages present at the anodes 152 and 156 as will be hereinafter explained. When no signal is present, the anodes 152 and 156 are maintained at a negative voltage of minus ten volts. Since the cathodes 154 and 158 are initially connected to a negative voltage of minus seventy volts via resistor 150, the crystal diodes 146 and 148 will conduct causing the voltage of the junction 160 to increase to minus ten volts. If the anode 152 of the crystal diode 146 becomes more positive, the crystal diode 146 will remain conducting so that the voltage at the junction 160 increases causing the crystal diode 148 to disconnect. Similarly, if the voltage at the anode 156 of the crystal diode 148 increases, the crystal diode 146 will become nonconductive. Therefore, the voltage at the junction 160 will always be equal to the greater of the two input voltages and the two input circuits will be isolated from each other since there is substantially no conduction from the junction 160 to either of the two input circuits.

The gate 142 comprises the crystal diodes 162 and 164 and the resistor 166 which connects the respective anodes 168 and 170 of the crystal diodes 162 and 164 to a positive voltage source of sixty-five volts. The cathode 172 of the crystal diode 164 is connected to the junction 160. The cathode 174 of the crystal diode 162 is connected to a clock pulse source 176 contained in the computer (not shown).

The gate 142 functions in the same manner as the gate 22 so that a signal will only appear at the junction 178 of the anodes 168 and 170 when a signal is present at the junction 160 simultaneously with a clock pulse from the clock pulse source 176.

The junction 178 of the gate 142 is connected to the triode amplifier 182 via crystal diode 184. The crystal diode 184 includes the anode 186 connected to the junction 178 and the cathode 188 connected to the grid 180 of the triode amplifier 182. The cathode 188 is coupled to the negative voltage source of minus seventy volts via resistor 189. The grid 180 is also connected to the cathode 191 of crystal diode 193, and the anode 195 of crystal diode 193 is connected to a negative voltage source of minus four volts. The crystal diode 193 operates to clamp the grid 180 at a maximum negative voltage of minus four volts. That is, if the grid 180 tends to go more negative than minus four volts, the crystal diode 193 will conduct to clamp the grid at minus four volts. The cathode 188 will also be clamped at a negative voltage of minus four volts and will disconnect if the voltage of the junction 178 goes below minus four volts. The crystal diode 184 therefore functions both as a buffer and also to protect the crystal diode 193 from large negative voltage swings.

The triode amplifier 182 includes an anode 190 which is coupled to a positive voltage source of two hundred volts by the primary winding 192 of the output transformer 194, and a cathode 197 which is grounded. The secondary winding 196 of the output transformer 194 is connected between a negative voltage source of minus ten volts and the output terminal 28. The output terminal 28 is also connected to the anode 156 of crystal diode 148 and serves to couple the output of the amplifier 144 to the input to the buffer 40.

The reshaper-retimer 26 functions to reshape and retime the gated signal G (see Fig. 2) which will appear at the output terminal 136 of the gate 22. The gated signal G will pass through the crystal diode 146 of the buffer 140 and appear at the crystal diode 164 of the gate 142. The clock pulses which are supplied by the clock pulse source 176 are of the same shape and are in synchronism with the clock pulses C of the computer and correspond to the reshaped and retimed pulses R. However, they occur at a fixed time after the clock pulses C; for example, a half of the period of the clock pulses C.

The clock pulses fed to the gate 142 are so chosen that if a gated pulse G is present at the junction 160, the gated pulse G will always appear a little earlier than the clock pulse from the clock pulse source 176 and will reach a sufficient amplitude by the time the next clock pulse appears. The clock pulse is then gated by the gate 142, amplified by the amplifier 144, and will appear at the output terminal 28 where it is fed back to the anode 156 of the buffer 140 to replace the gated pulse G at the junction 160, thus maintaining the output signal at the output terminal 28 until the termination of the clock pulse. In other words, the gated pulse G prepares the gate 142 to pass the beginning portion of the clock pulse which thereafter serves to hold the gate 142 open until the clock pulse completely passes through the gate 142 and appears at the output terminal 28 as the reshaped and retimed pulse R corresponding to the gated pulse G.

In order to simplify the explanation of the invention, all potential sources used throughout the system have been indicated by their individual magnitudes and polarities. It will be understood, of course, that these magnitudes and polarities are not critical and the invention is not so limited, the particular values being given by way of illustration only.

While only three representative embodiments of the invention disclosed herein have been outlined in detail, there will be obvious to those skilled in the art many modifications and variations accomplishing the foregoing objects and realizing many or all of the advantages, but which do not depart essentially from the spirit of the invention.

What is claimed is:

1. Apparatus for reproducing information recorded on the surface of a magnetizable medium comprising means for generating a playback signal and an inverted playback signal corresponding to the recorded information, one of said signals being delayed in time with respect to the other of said signals, and means for combining the common polarity portions of said delayed signal and the other of said signals to produce a combined signal corresponding to the recorded information.

2. Apparatus for reproducing information recorded on the surface of a magnetizable medium comprising means for generating a playback signal and an inverted playback signal corresponding to the recorded information, one of said signals being delayed in time with respect to the other of said signals, means for combining the common polarity portions of said delayed signal and the other of said signals to produce a combined signal corresponding to the recorded information, and means for reshaping said combined signal.

3. Apparatus for reproducing information recorded on the surface of a magnetizable medium comprising means for generating a playback signal and an inverted playback signal corresponding to the recorded information, one of said signals being delayed in time with respect to the other of said signals, means for combining the common polarity portions of said delayed signal and the other of said signals to produce a combined signal corresponding to the recorded information, and means for retiming said combined signal.

4. Apparatus for reproducing information recorded on the surface of a magnetizable medium comprising means for generating a playback signal and an inverted playback signal corresponding to the recorded information, one of said signals being delayed in time with respect to the other of said signals, means for combining the common polarity portions of said delayed signal and the other of said signals to produce a combined signal corresponding to the recorded information, and means for reshaping and retiming said combined signal.

5. Apparatus for reproducing information recorded on the surface of a magnetizable medium comprising means for generating a playback signal and an inverted signal corresponding to the recorded information, means for delaying one of said signals to produce a delayed signal, and means for combining the positive polarity portions of said delayed signal and the other of said signals to produce a combined signal representing the recorded information.

6. Apparatus for reproducing information recorded on the surface of a magnetizable medium comprising means for generating a signal and an inverted signal corresponding to the recorded information, means for delaying said signal to produce a delayed signal, and means for combining the common polarity portions of said delayed signal and said inverted signal to produce a combined signal corresponding to the recorded information.

7. Apparatus for reproducing information recorded on the surface of a magnetizable medium comprising means for generating a signal and an inverted signal corresponding to the recorded information, means for delaying said signal to produce a delayed signal, and means for combining the positive polarity portions of said delayed signal and said inverted signal to produce a combined signal corresponding to the recorded information.

8. Apparatus for reproducing information recorded on a magnetizable medium comprising means for generating a playback signal corresponding to the recorded information, means for delaying and inverting said playback signal to produce an inverted delayed playback signal, and means for combining the common polarity portions of said playback signal and said inverted delayed playback signal to produce a combined signal representing the recorded information.

9. Apparatus for reproducing information recorded on a magnetizable medium comprising means for generating a playback signal corresponding to the recorded information, means for delaying and inverting said playback signal to produce an inverted delayed playback signal, and means for combining the positive polarity portions of said playback signal and said inverted delayed playback signal to produce a combined signal representing the recorded information.

10. Apparatus for reproducing pulses positively and negatively recorded on the surface of a magnetizable medium comprising an amplifier-inverter to generate playback and inverted playback signals corresponding to the recording pulses, a delay device for delaying said playback signals to produce delayed playback signals, an inverter for inverting said delayed playback signals to produce delayed inverted playback signals, a first gate for combining the positive polarity portions of said delayed playback signals and said inverted playback signals to produce gated pulses corresponding to positive pulse recordings, and a second gate for combining the positive polarity portions of said delayed inverted playback signals and said playback signals to produce gated pulses corresponding to negative pulse recordings.

11. Apparatus for reproducing pulses positively and negatively recorded on the surface of a magnetizable medium comprising an amplifier-inverter to generate playback and inverted playback signals corresponding to the recording pulses, a delay device for delaying said playback signals to produce delayed playback signals, an inverter for inverting said delayed playback signals to produce delayed inverted playback signals, a first gate for combining the positive polarity portions of said delayed playback signals and said inverted playback signals to produce gated pulses corresponding to positive pulse recordings, a second gate for combining the positive polarity portions of said delayed inverted playback signals and said playback signals to produce gated pulses corresponding to negative pulse recordings, a first reshaper and retimer to reshape and retime said gated pulses corresponding to positive pulse recordings, and a second reshaper and retimer to reshape and retime said gated pulses corresponding to negative pulse recordings.

12. Apparatus for reproducing pulses positively and negatively recorded on the surface of a magnetizable medium comprising an amplifier-inverter to generate playback and inverted playback signals corresponding to the recording pulses, a first delay device for delaying said playback signals to produce delayed playback signals, a second delay device for delaying said inverted playback signals to produce delayed inverted playback signals, a first gate for combining the positive polarity portions of said delayed playback signals and said inverted playback signals to produce gated pulses corresponding to positive pulse recordings, and a second gate for combining the positive polarity portions of said delayed inverted playback signals and said playback signals to produce gated pulses corresponding to negative pulse recordings.

13. Apparatus for reproducing pulses positively and negatively recorded on the surface of a magnetizable medium comprising an amplifier-inverter to generate playback and inverted playback signals corresponding to the recording pulses, a first delay device for delaying said playback signals to produce delayed playback signals, a second delay device for delaying said inverted playback signals to produce delayed inverted playback signals, a first gate for combining the positive polarity portions of said delayed playback signals and said inverted playback signals to produce gated pulses corresponding to positive pulse recordings, a second gate for combining the positive polarity portions of said delayed inverted playback signals and said playback signals to produce gated pulses corresponding to negative pulse recordings, a first reshaper and retimer to reshape and retime said gated pulses corresponding to positive pulse recordings, and a second reshaper and retimer to reshape and retime said gated pulses corresponding to negative pulse recordings.

14. Apparatus for reproducing recorded information comprising means for generating a playback signal and an inverted playback signal corresponding to the recorded information, one of said signals being delayed in time with respect to the other of said signals, and means for combining the common polarity portions of said delayed signal and the other of said signals to produce a combined signal corresponding to the recorded information.

15. Apparatus for reproducing recorded information comprising means for generating a playback signal and an inverted playback signal corresponding to the recorded information, one of said signals being delayed in time with respect to the other of said signals, means for combining the common polarity portions of said delayed signal and the other of said signals to produce a combined signal corresponding to the recorded information, and means for reshaping and retiming said combined signal.

16. Apparatus for reproducing recorded information comprising means for generating a signal and an inverted signal corresponding to the recorded information, means for delaying said signal to produce a delayed signal, and means for combining the common polarity portions of said delayed signal and said inverted signal to produce a combined signal corresponding to the recorded information.

17. Apparatus for reproducing recorded information comprising means for generating a signal and an inverted signal corresponding to the recorded information, means for delaying said signal to produce a delayed signal, and means for combining the positive polarity portions of said delayed signal and said inverted signal to produce a combined signal corresponding to the recorded information.

18. Apparatus for reproducing recorded information comprising means for generating a playback signal corresponding to the recorded information, means for delaying and inverting said playback signal to produce an inverted delayed playback signal, and means for combining the common polarity portions of said playback signal and said inverted delayed playback signal to produce a combined signal representing the recorded information.

19. Apparatus for reproducing recorded information comprising means for generating a playback signal corresponding to the recorded information, means for delaying and inverting said playback signal to produce an inverted delayed playback signal, and means for combining the positive polarity portions of said playback signal and said inverted delayed playback signal to produce a combined signal representing the recorded information.

20. Apparatus for reproducing recorded pulses comprising an amplifier-inverter to generate playback and inverted playback signals corresponding to the recording pulses, a delay device for delaying said playback signals to produce relayed playback signals, and a gate for combining the positive polarity portions of said delayed playback signals and said inverted playback signals to produce gated pulses corresponding to the pulse recordings.

21. Apparatus for reproducing recorded pulses comprising an amplifier-inverter to generate playback and inverted playback signals corresponding to the recording pulses, a delay device for delaying said playback signals to produce delayed playback signals, a gate for combining the positive polarity portions of said delayed playback signals and said inverted playback signals to produce gated pulses corresponding to the pulse recordings.

22. Apparatus for reproducing information recorded on the surface of a magnetizable medium comprising means for generating a playback signal and an inverted playback signal corresponding to the recorded information, one of said signals being delayed in time about one quarter the period of said playback signals with respect to the other of said signals, and means for combining the common polarity portions of said delayed signal and the other of said signals to produce a combined signal corresponding to the recorded information.

23. Apparatus for reproducing information recorded on the surface of a magnetizable medium comprising means for generating a playback signal and an inverted playback signal corresponding to the recorded information, one of said signals being delayed in time about one third the period of said playback signal with respect to the other of said signals, and means for combining the common polarity portions of said delayed signal and the other of said signals to produce a combined signal corresponding to the recorded information.

24. Apparatus for reproducing information recorded on the surface of a magnetizable medium comprising means for generating a playback signal and an inverted playback signal corresponding to the recorded information, one of said signals being delayed in time about one half the period of said playback signal with respect to the other of said signals, and means for combining the common polarity portions of said delayed signal and the other of said signals to produce a combined signal corresponding to the recorded information.

25. Apparatus for reproducing information recorded on the surface of a magnetizable medium comprising means for generating a playback signal and an inverted playback signal corresponding to the recorded information, one of said signals being delayed in time with respect to the other of said signals, the amount of said delay being chosen to be about one quarter to one half the period of said playback signal, and means for combining the common polarity portions of said delayed signal and the other of said signals to produce a combined signal corresponding to the recorded information.

No references cited.